(12) United States Patent
Reeser et al.

(10) Patent No.: US 11,998,037 B2
(45) Date of Patent: Jun. 4, 2024

(54) BULK MATERIAL PROCESSING SYSTEM AND METHOD

(71) Applicant: PPM Technologies Holdings, LLC, Newberg, OR (US)

(72) Inventors: Devin Ray Reeser, Newberg, OR (US); Jack Reeser, Newberg, OR (US)

(73) Assignee: PPM TECHNOLOGIES HOLDINGS, LLC, Newberg, OR (US)

( * ) Notice: Subject to any disclaimer, the term of this patent is extended or adjusted under 35 U.S.C. 154(b) by 661 days.

(21) Appl. No.: 16/852,238

(22) Filed: Apr. 17, 2020

(65) Prior Publication Data

US 2020/0329754 A1    Oct. 22, 2020

Related U.S. Application Data

(60) Provisional application No. 62/835,428, filed on Apr. 17, 2019.

(51) Int. Cl.
| | |
|---|---|
| *A23L 7/187* | (2016.01) |
| *A23L 7/183* | (2016.01) |
| *A23P 20/18* | (2016.01) |
| *A23P 30/38* | (2016.01) |
| *A47J 37/10* | (2006.01) |

(Continued)

(52) U.S. Cl.
CPC .............. *A23P 20/18* (2016.08); *A23L 7/183* (2016.08); *A23L 7/187* (2016.08); *A23P 30/38* (2016.08); *A47J 37/106* (2013.01); *A47J 37/1238* (2013.01); *B05D 3/0218* (2013.01)

(58) Field of Classification Search
CPC .... A47J 2027/043; A47J 27/16; A47J 37/044; A47J 37/045; A47J 37/106; A47J 37/1238; A47J 37/1214; A23L 7/187; A23P 30/38; A23P 20/18
USPC ......................................... 99/323.9
See application file for complete search history.

(56) References Cited

U.S. PATENT DOCUMENTS 3,295,434 A * 1/1967 Wilhelm ................. A47J 37/04
126/21 R
3,606,828 A * 9/1971 Smith ..................... A23P 30/38
99/323.11

(Continued)

FOREIGN PATENT DOCUMENTS

| CN | 107348361 A | 11/2017 |
|---|---|---|
| DE | 19804386 A1 | 9/1999 |
| WO | 2016107652 A1 | 7/2016 |

*Primary Examiner* — Reginald Alexander
(74) *Attorney, Agent, or Firm* — McCoy Russell LLP

(57) ABSTRACT

A bulk material processing system and method for operation of such a system is provided. In one example, the bulk material processing system may include a conveyor assembly including, a conveyor with a conveyor surface supporting a plurality of constituents of the bulk material received from a bulk material source and a motor configured to generate conveyor movement. The bulk material processing system also includes a heating assembly including a first heater configured to generate heat at a first heating zone on the conveyor surface, and a coating application assembly including a first coating source configured to provide a first liquid coating to a first spray nozzle configured to spray the first liquid coating onto a portion of the plurality of constituents of the bulk material in the first heating zone while the first heater is activated.

10 Claims, 5 Drawing Sheets

(51) Int. Cl.
*A47J 37/12* (2006.01)
*B05D 3/02* (2006.01)

(56) References Cited

U.S. PATENT DOCUMENTS

| | | | |
|---|---|---|---|
| 4,269,861 A * | 5/1981 | Caridis | A23L 19/18 426/441 |
| 5,066,505 A * | 11/1991 | Vos | A47J 37/047 426/523 |
| 5,570,626 A * | 11/1996 | Vos | A47J 37/1238 99/407 |
| 5,878,910 A | 3/1999 | Gibernau et al. | |
| 6,045,851 A | 4/2000 | Cross | |
| 6,056,986 A * | 5/2000 | Miyagawa | A47J 27/04 99/417 |
| 2002/0034567 A1* | 3/2002 | Jacobsen | A23L 7/183 426/241 |
| 2006/0083831 A1* | 4/2006 | Caridis | A23L 5/12 426/438 |
| 2014/0093636 A1 | 4/2014 | Fitzgerald et al. | |

* cited by examiner

BULK MATERIAL PROCESSING SYSTEM AND METHOD

CROSS-REFERENCE TO RELATED APPLICATION

This application claims priority to U.S. Provisional Application No. 62/835,428, entitled "BULK MATERIAL PROCESSING SYSTEM AND METHOD," filed Apr. 17, 2019, the entire contents of which is hereby incorporated by reference in its entirety for all purposes.

FIELD

The present description relates generally to a bulk material processing system and a method for operating the bulk material processing system.

BACKGROUND AND SUMMARY

Conveyors may be used in a wide variety of industries for transportation of bulk materials, small parts, etc. Additionally, some conveyors may be used to perform processing operations such as heating, screening, cooling, and other processing operations on bulk materials such as food products, small parts, or the like. Previous conveyor systems have suffered from inadequate control over heating of the bulk material, such as popcorn kernels. For instance, previous popcorn popping systems have employed microwave irradiation to pop hard popcorn kernels such that the hull ruptures and the kernel expands. For example, US 2002/0034567 A1 to Jacobsen et al. discloses a popcorn cooking system utilizing microwave irradiation to transform the kernels into a popped state.

The inventors have recognized several drawbacks with the popcorn processing system disclosed in US 2002/0034567 A1. Inaccuracies in microwave irradiation control can result in low popped kernel yields, for example. Low yields may result from the system's inability heat the kernels at a targeted rate. For instance, if the kernels are heated too fast, the outer layer of the kernel can rapidly reach a high pressure causing kernel rupture before the starch at the kernels center is gelatinized. On the other hand, heating the kernels too slowly can lead to the kernels remaining unpopped. For instance, slow heating may cause steam to slowly leak out the tip without rupturing the hull. It will also be appreciated that variations in kernel moisture content can increase variability in yields due to the different heating requirements of the different kernels. Additionally, previous system have suffered from deficiencies with regard to filtering unpopped kernels. For instance, unpopped kernels may be sorted at a late stage in the kernel popping process and are a waste product of the system. Other popcorn processing systems utilizing oil popping operation have been designed to process kernels in batches. These batch style systems therefore exhibit processing inefficiencies.

The inventors herein have recognized potential solutions to at least some of the aforementioned problems. In one example, a bulk material processing system is provided that includes a conveyor assembly having a conveyor with a conveyor surface supporting a plurality of constituents of the bulk material received from a bulk material source and a motor configured to generate conveyor movement. The processing system further comprises a heating assembly including a first heater configured to generate heat at a first heating zone on the conveyor surface. The processing system also comprises a coating application assembly including a first coating source configured to provide a first liquid coating to a first spray nozzle configured to spray the first liquid coating onto a portion of the plurality of constituents of the bulk material in the first heating zone while the first heater is activated. In this way, the rate of heating of the kernels may be precisely controlled through active adjustment of both the heat applied to the bulk material (e.g., popcorn kernels) and an amount of coating (e.g., oil) sprayed on the bulk material. Consequently, targeted bulk material heating profiles can be achieved thereby increasing the yield of cooked bulk material (e.g., popped kernels) in the system, resulting in increased system efficiency and reduced production costs related to cooking the bulk material, if desired. Furthermore, active control of both the heat applied to the bulk material and the coating sprayed on the bulk material allows the system to be adjusted based on variances (e.g., moisture variances, size variances, component proportions, etc.) in the bulk material's properties. As a result, yields of cooked bulked material may be further increased in the system. Incorporating the conveyor and corresponding heating zone and coating spray nozzle into the system allows the system to be continuously operated to process the bulk material, if wanted. The system can therefore achieve increased efficiency and throughput in relation to batch style processing systems, if desired.

In one example, the bulk material processing system may further include a bulk material filtering assembly having a filter positioned in the conveyor surface downstream of the heater and the spray nozzle, where the filter is configured to filter an uncooked portion of the plurality of constituents of the bulk material. In such an example, the filtering assembly further includes a return conduit configured to transport the filtered uncooked portion of the plurality of constituents back to the conveyor upstream of the first heating zone. In this way, uncooked bulk material such as unpopped kernels can be filtered out and returned to the conveyor input. As a result, the yield of cooked bulk material in the system may be further increased. Therefore, system efficiency is further increased.

Further in one example, the amount of heat applied to the bulk material and/or the coating sprayed onto the bulk material may be adjusted based on the amount of uncooked bulk material that is filtered by the bulk material filtering assembly. In this way, the filtering assembly may be used for feedback control to further increase cooked bulk material yields, if wanted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for actively controlling heat applied to a bulk material and an amount of coating sprayed onto the bulk material while it is heated to accurately control cooking of the bulk material. The bulk material is described herein as popcorn kernels. However, the system may be used to process other suitable types of bulk material. For instance, the system may be used to thaw frozen food products, heat and/or season pre-cooked food products, etc.

Actively and cooperatively controlling both the heat applied to the bulk material as well as the coating sprayed onto the material allows the bulk material to undergo a targeted temperature increase to cook the material as desired. Consequently, yields of cooked bulk materials (e.g., popped kernels) may be increased, thereby increasing the system's efficiency. The system includes a heating assembly with a heater increasing the temperature in a heating zone on a conveyor supporting the bulk material. As the bulk material is heated a coating is sprayed onto the heated bulk material to trigger cooking (e.g., transformation of kernels from an unpopped state to a popped state) of the bulk material. In one example, oil sprayed onto a kernel increases the kernel's surface area, thereby increasing the amount of heat that can be transferred to the kernel. In one example, the mass flow of the kernels into the system may be controlled and then oil spray metering may be adjusted (e.g., increased or decreased) based on the mass flow of kernels into the system.

Figure 1:
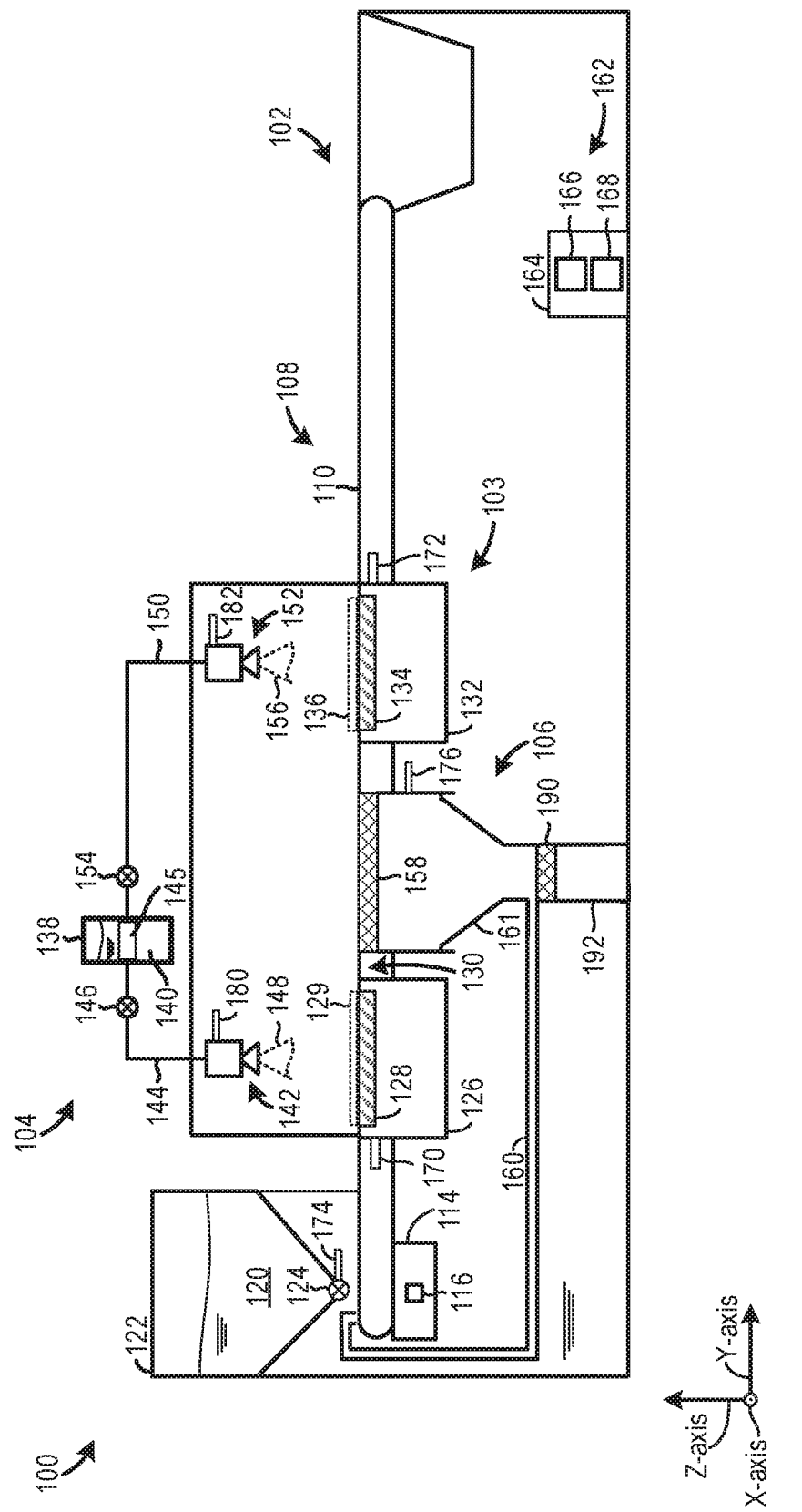
FIG. 1 shows an illustration of a bulk material processing system.

FIG. 1 shows a schematic depiction of a bulk material processing system 100 (e.g., popcorn processing system). The system is a continuous operation system in contrast to a batch process system. The bulk material processing system 100 includes a conveyor assembly 102, a heating assembly 103, a coating application assembly 104, and a bulk material filtering assembly 106. However, other system configurations have been contemplated such as a system having the conveyor assembly and the coating application assembly, for instance.

The conveyor assembly 102 includes a conveyor 108 with a conveyor surface 110 supporting a plurality of constituents of the bulk material. The conveyor 108 may also include a pan designed to contain the constituents, in one example. For instance, the pan may include sidewalls that reduce the likelihood of material falling off the sides of the conveyor. In the illustrated example, the bulk material is popcorn including a plurality of kernels. However, other suitable bulk materials have been contemplated such as frozen food products, pre-cooked food products, etc., as previously discussed.

The conveyor 108 may be a vibratory or horizontal motion conveyor driven by a motor 114 with a mechanism 116 to achieve the aforementioned functionality. As such, the motor 114 may be configured to vibrate the conveyor 108 according to a selected amplitude and/or pattern. The mechanism 116, in the motor 114, may therefore be designed to vibrate the conveyor 108, in one example. For instance, the motor may include a mechanical piston designed to vibrate the conveyor 108. Additionally or alternatively, the conveyor may include a belt that is rotated by pulleys driven by devices in the motor. Therefore, in one example, the conveyor may include a rotating belt that is also vibrated. In such an example, the mechanisms that rotate the pulleys and vibrate the conveyor 108 may be enclosed in a common housing, in one example. However, in other examples, the mechanism that rotates the pulleys may be separate from the mechanism vibrating the conveyor 108. Furthermore, other types of conveyors for use in the system have been contemplated such as flexible conveyors, chain conveyors, slip conveyors, combinations thereof, and the like.

The conveyor 108 may receive a bulk material 120 including a plurality of constituents from a bulk material source 122. The bulk material source 122 may be any suitable component containing the bulk material including a reservoir, a sealed container, a hopper, a conduit, an upstream conveyor, combinations thereof, etc. A valve 124 may be attached to the bulk material source 122 and is configured to adjust the amount of bulk material introduced onto the conveyor 108. For instance, the valve 124 may include plates, actuators, etc., controlling flow of the bulk material onto the conveyor 108.

The heating assembly 103 in the bulk material processing system 100 includes a first heater 126. The first heater 126 includes a heating element 128. In the illustrated example, the heating element 128 is adjacent to an interior surface 130 of the conveyor 108. However, other heating element positions have been envisioned. The heating element 128 is designed to heat bulk material on the conveyor surface 110 in a first heating zone 129. The heating element may therefore include an electric resistance heating device, a gas burner, infrared/heat lamps, microwave heating devices, etc. As such, the heating element 128 may include and/or be coupled to an energy source (e.g., battery, capacitor, etc.,), a gas source, etc.

In the depicted example, the heating assembly 103 includes a second heater 132 including a heating element 134 adjacent to the interior surface 130 of the conveyor 108. The heating element 134 is designed to generate heat in a second heating zone 136 on the conveyor 108. However, in other examples, the heating assembly 103 may include one heater. The heating element 134 may be an electric resistance heating device, a gas burner, infrared/heat lamp, microwave heating device, etc.

In the illustrated example, there is a gap between the first heating zone 129 and the second heating zone 136. However, in other examples the heating zones may be adjacent to one another with regard to a downstream direction. Additionally, in one example, the heating zones may have a similar size and/or profile. However, in other examples, the size and/or profile between the heating zones may vary. For instance, the first heating zone may be greater in size than the second heating zone or vice versa. Further, in other examples, the type of heat delivered to the first and second heating zones via the first and second heater may vary or the output of the heaters may vary. For example, the first heating zone may be heated via convection and the second heating zone may be heated via conduction. Thus, the heaters may have a variance in heating functionality, size, profile, etc. However, in another example, the first heater 126 and the second heater 132 may have common features, configurations, and/or be of a similar type, to reduce manufacturing costs.

As shown, the first heater 126 is positioned upstream of the second heater 132. Upstream and downstream as described herein refers to a direction of bulk material transport through the system. Using two heaters in the system allows the profile of temperature increase in the bulk material to be precisely controlled. Consequently, heating control schemes yielding increased amounts of cooked bulk material (e.g., popped popcorn) can be implemented in the system. As described herein, cooked bulk material is a bulk material that has achieved a set of cooking conditions or a range of cooking conditions such as a desired cooking temperature threshold, a temperature range, a volumetric threshold, a volumetric range, a surface area threshold, a moisture content threshold, a moisture content range, and/or combinations thereof. In one example, a cooked popcorn kernel may be a kernel whose hull has ruptured and the interior material has expanded beyond a predetermined threshold. However, numerous suitable cooking conditions delineating cooked bulk material have been contemplated. For instance, in another example a cooked popcorn kernel may be a kernel whose moisture content has decreased by a threshold percentage, value, etc.

The coating application assembly 104 in the system 100 includes a coating source 138 storing a liquid coating 140 (e.g., oil such as liquid butter, vegetable oil, palm oil, coconut oil, etc.). The coating source 138 may be any suitable component storing the liquid coating 140 such as a container (e.g., sealed or unsealed container), conduit, pressurized enclosure, etc. The coating source 138 is coupled to a spray nozzle 142 via a coating conduit 144. In one example, the coating may be heated during and/or prior to flowing through the spray nozzle 142. A pump 145 may be included in the coating application assembly 104 and designed to drive liquid coating flow through the assembly. The pump 145 may include conventional components to achieve the aforementioned functionality such as a housing, chambers, piston(s), impeller(s), pick-up conduit(s), etc. However, in alternate examples, the pump may be omitted from the coating application assembly and the assembly may be designed as a gravity driven assembly.

A valve 146 is coupled to the coating conduit 144 and is designed to vary an amount of coating flowing there through. The valve 146 may include plates, solenoids, actuators, etc., allowing the valve to achieve coating flow-rate variance. Although the valve 146 is shown coupled to the coating conduit 144, in other examples the valve 146 may be positioned in alternate locations in the system such as at the outlet of the coating source 138, integrated into the spray nozzle 142, etc. The spray nozzle 142 is design to spray a liquid coating 148 onto bulk material in the first heating zone 129.

The coating application assembly 104 may further include a second coating conduit 150 in fluidic communication with the coating source 138. A second spray nozzle 152 receives liquid coating from the second coating conduit 150. Additionally, a valve 154 is coupled to the second coating conduit 150, in the illustrated example. However, in other examples the valve 154 may be integrated into the second spray nozzle 152. The second spray nozzle 152 is designed to spray liquid coating 156 onto bulk material traveling through the second heating zone 136.

In other examples, the coating application assembly 104 may include a second coating source distinct from the first coating source 138 providing a liquid coating to the second spray nozzle 152 via a second coating conduit having a valve coupled thereto. In such an example, the liquid coatings in the sources may be similar. However, in other examples, the sources may supply different types of liquid coating to the nozzles. For instance, the coating application assembly 104 may spray or otherwise deliver a cheese slurry onto food product on the conveyor 108. Still further in other examples, the second spray nozzle may be omitted from the coating application assembly.

As shown, the spray nozzle 142 is positioned vertically above the first heater 126. Likewise, the second spray nozzle 152 is shown positioned vertically above the second heater 132. However, other relative positions of the heaters and spray nozzles have been envisioned which enable bulk material to be heated in the heating zones 129 and 136 and coated via the liquid coating. For instance, the coating may be sprayed from one or both lateral sides of the conveyor. It will be appreciated that the amount of heat and/or liquid coating delivered to the first and/or second heating zones may be dynamically varied based on system operating conditions. In one example, adjusting (e.g., increasing or decreasing) the pump output may in turn adjust oil flow. In such an example, the pump 145 may be coupled to or integrated in the coating source 138. The oil volume may be predicted by pump speed (e.g., RPM) or calculated using a flow meter, in some examples. Additionally, in one example, the seed corn may be metered onto the conveyor so that a known amount of seed corn is fed into the conveyor and the oil is metered to a specific ratio driven by recipes in the controls.

The bulk material filtering assembly 106 in the system 100 is designed to filter a portion (e.g., uncooked portion) of the constituents of the bulk material. Specifically, in one example, the bulk material filtering assembly 106 may be designed to filter unpopped and/or partially popped popcorn kernels from the bulk material on the conveyor. A filter 158 may be included in the bulk material filtering assembly 106. The filter 158 is designed to remove uncooked constituents from the bulk material downstream of the heating assembly 103. In the illustrated example, the filter 158 is positioned between the first heating zone 129 and the second heating zone 136. In this way, the filtered material may not go through the coating process and therefore pass through the second spray nozzle 152. However, in other examples, the filter 158 may be positioned in another suitable location in the assembly, such as downstream of the second heating zone 136. A return conduit 160 extends between a catch bin 161 positioned below the filter 158 and the conveyor 108 upstream of the first heating zone 129. In one example, the filtered constituents may be transported to a dedicated lane on the conveyor 108. In this way, the filtering assembly may reintroduce the uncooked constituents onto the conveyor. The lane may be a section of a pan in the conveyor divided from a main section. In one example, the main section may have a greater width than the filtered material section. Continuing with such an example, the conveyor may include a diverter running longitudinally along at least a portion of the conveyor. Thus, the diverter may extend vertically and run from an infeed to a discharge of the conveyor pan, in one example. Further in one example, the filtered constituent lane may not direct uncooked material into the filter for a second time but rather the constituents may be fed into a waste stream. However, other filtering configurations the in the assembly have been contemplated. Additionally, in other examples, the return conduit 160 may transport the filtered material into other suitable locations in the assembly such as to the bulk material source 122, downstream of first heating zone 129 and upstream of the filter 158, etc.

In one example, the return conduit 160 may be a conveyor. However, other types of material transport devices may be used in the return conduit 160 such as a pneumatic conduit, an auger, etc. The bulk material filtering assembly 106 may also include a second filter 190 in the return conduit 160. The second filter 190 may filter or otherwise sort bulk material constituents that are not suitable for returning to the bulk material source 122 or the input of the conveyor 108. The second filter 190 may be coupled to a storage container 192 collecting the bulk material filtered via the second filter 190. It will be appreciated that in some examples, the bulk material filtering assembly 106 may not include the return conduit 160 and the filtered bulk material may be directed into a storage container.

A control system 162 is also shown in FIG. 1. It will be appreciated that the control system 162 may be included in the bulk material processing system 100. The control system 162 includes a controller 164 having a processor 166 and memory 168. However, the controller 164 may include additional or alternative hardware designed to implement the control methods described herein.

The processor 166 includes one or more physical devices designed to execute instructions. For example, the processor may execute instructions that are part of one or more programs, routines, applications, libraries, components, objects, data structures, and the like. Such instructions may be implemented to perform a method, task, control scheme, control technique, implement a data type, etc. to achieve a technical effect.

The memory 168 includes one or more physical devices designed to hold instructions executable by the processor 166 to implement the methods and processes described herein. The memory 168 may include removable and/or built-in devices. The memory may include semiconductor device memory (e.g., RAM, EPROM, flash memory, etc.), optical device memory (e.g., DVD, CD, etc.), and/or magnetic device memory (e.g., hard-disk drive, floppy-disk drive, tape drive, etc.), and the like. Additionally, the memory 168 may include static, dynamic, volatile, nonvolatile, read/write, random-access, sequential-access, file-addressable, read-only, non-transitory, and/or content-addressable devices, in one example.

Furthermore, the controller 164 may both send control commands to and receive inputs (e.g., sensor inputs) from components, sensors, etc., in the system 100. It will be appreciated that such commands, inputs, etc., may be transferred between the components, sensors, etc., and the controller via wired and/or wireless electronics. As such, sensors may also be included in the control system 162. The sensors include, in one example, a temperature sensor 170 coupled to the first heater 126, a temperature sensor 172 coupled to the second heater 132, a flow sensor 174 coupled to the bulk material source 122, a sensor 176 (e.g., optical sensor) configured to sense an amount of uncooked bulk material filtered via the filter 158, a flowrate sensor 180 coupled to the first spray nozzle 142, a flowrate sensor 182 coupled to the second spray nozzle 152, etc. It will be appreciated that other sensors may be included in the system designed to sense temperature (e.g., ambient temperature, bulk material temperature, etc.,) bulk material flowrate, bulk material size, humidity, pressure, and the like.

The first heater 126 may include an actuator adjusting an amount of heat generated by the first heater 126. It will be appreciated that the other components receiving command signals may also include actuators providing component adjustment functionality. For instance, the valve 146 may include an actuator adjusting the amount of liquid coating flowing there through.

In one example, the controller 164 includes computer readable instructions stored in the memory 168 that when executed cause the processor to vary an amount of heat generated by the first heater 126 based on an amount of liquid coating sprayed onto the portion of the plurality of constituents by the first spray nozzle 142 to change the plurality of constituents from an uncooked state to a cooked state. In this way, both the amount of heat and coating applied to the bulk material may be actively controlled to increase cooked material yields in the system, thereby increasing system efficiency and driving down bulk material processing costs.

Additionally, in one example the computer readable instructions may further include varying an amount of heat generated by the second heater 132 based on an amount of the second liquid coating sprayed onto the plurality of constituents by the second spray nozzle 152. Continuing with such an example, the computer readable instructions may further include varying the amount of heat generated by the second heater 132 based on the amount of heat generated by the first heater 126 and/or vary the amount of liquid coating sprayed onto the plurality of constituents by the second spray nozzle 152 based on the amount of liquid coating sprayed onto the plurality of constituents by the first spray nozzle 142.

In one example, the controller 164 may drive the heating elements to a specific temperature set point. Continuing with the example, the seed corn may be metered onto the conveyor by volume and the oil may be applied to the seed corn by a percentage of the seed corn set point. The three set points: heat, and mass of seed corn and oil, are adjustable and may be stored under recipes in the controls for repeatability, in some examples.

In yet another example, the computer readable instructions may include varying an amount of heat applied to the plurality of constituents by the first heater 126 and/or vary an amount of liquid coating sprayed onto the plurality of constituents by the first spray nozzle 142 based on the amount of constituents filtered by the filter in the bulk material filtering assembly 106. In this way, the filtered material may be used in a feedback control loop to decrease the amount of filtered material by increasing the likelihood of the bulk material achieving a cooked state when passing through the heating zones.

Further, in one example, the computer readable instructions may include varying an amplitude and/or pattern of vibration generated by the motor 114 based on the flowrate of coating sprayed through the first and/or second spray nozzle(s) 142, 152. In this way, the amount of bulk material agitation may be augmented to further increase the likelihood of the bulk material achieving a cooked state when passing through the heating zones. It will also be appreciated that the control system 162 and specifically the controller 164 may be designed to carry out the control methods described herein.

Further, in one example, the computer readable instructions may further include instructions for continuously feeding the plurality of bulk material constituents onto the conveyor and processing the bulk material constituents. The system's processing efficiency can therefore be increased along with system throughput and profitability, if desired, in comparison to batch style processing systems.

Figure 2:
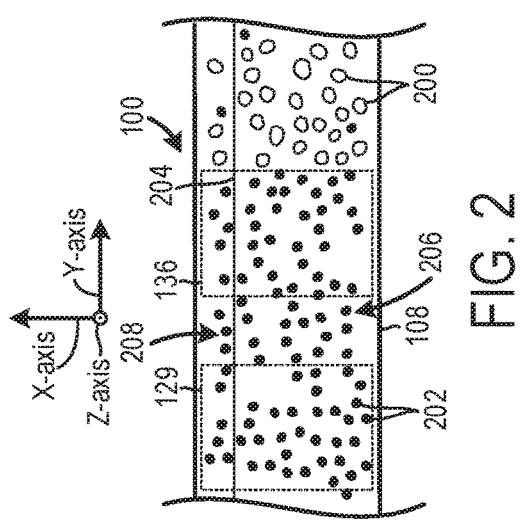
FIG. 2 shows a detailed view of a portion of a conveyor in the bulk material processing system, shown in FIG. 1.

FIG. 2 shows a detailed view of a section of the conveyor 108 in the bulk material processing system 100 above the heating assembly 103, shown in FIG. 1. The first heating zone 129 and the second heating zone 136 are shown in FIG. 2. FIG. 2 also shows the constituents in the bulk material being cooked in the heating zones 129, 136. As such, the kernels or more generally bulk material constituents may transition from an uncooked state to a cooked state as they travel through the heating zones. Cooked constituents of the bulk material are indicated at 200 and uncooked constituents are indicated at 202. Although, FIG. 2 shows the bulk material transitioning to a cooked state as it leaves the second heating zone 136, the cooking of certain portions of the bulk material may occur more rapidly while other portions are cooked more slowly, for instance. FIG. 2 also shows a diverter 204 (e.g., vertical diverter). As previously, discussed the diverter 204 partitions the conveyor into a main section 206 and a filtered constituent section 208. Thus, the diverter 204 acts as a barrier dividing the previously filtered constituents from the constituent on their initial run through the system.

Figure 3:
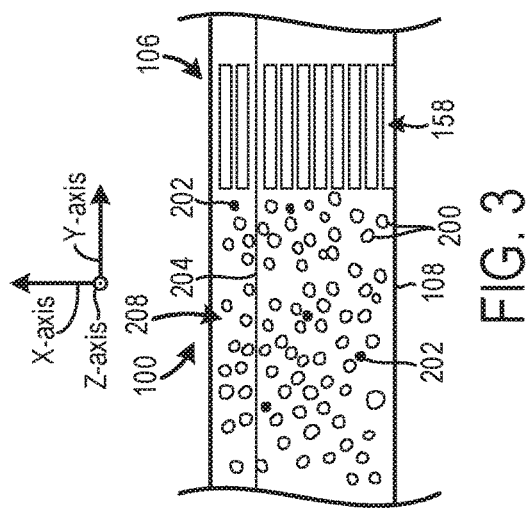
FIG. 3 shows another detailed view of a second portion of a conveyor in the bulk material processing system, shown in FIG. 1.

FIG. 3 shows a detailed view of a section of the conveyor 108 in the bulk material processing system 100 near the bulk material filtering assembly 106. Again, cooked constituents are indicated at 200 and uncooked constituents are indicated at 202. The filter 158 in the bulk material filtering assembly 106 is also shown in FIG. 3. As previously, discussed, the filter 158 removes uncooked constituents (e.g., unpopped popcorn kernels) from the bulk material stream and the filtered constituent may be then transported back to the conveyor, such as at a location upstream of the first heating zone.

The filter 158 is depicted as a rod screen in FIG. 3. However, it will be appreciated that other types of filters may be used, in other examples. For instance, the filter 158 may additionally or alternatively include one or more mesh screens, sieves, etc. It will be appreciated that in the popcorn use case example, the profile of the openings in the filter may be selected based on a variance in the size of the uncooked popcorn kernels. FIG. 3 again shows the diverter 204. It will be appreciated that the section of the filter 158 in the filtered constituent section 208 may direct the uncooked constituents that have been filtered for a second time to a waste stream which may include a waste constituent bin, for instance. However, in other examples, the diverter 204 may not extend down the conveyor to the filter.

Coordinate axes (X, Y, and Z) are illustrated in FIGS. 1-3 for reference. In one example, the Z-axis may be a vertical axis (e.g., parallel to a gravitational axis). Furthermore, the X-axis may be a lateral axis and the Y-axis may be a longitudinal axis. However, other orientations of the axes have been contemplated.

Figure 4:
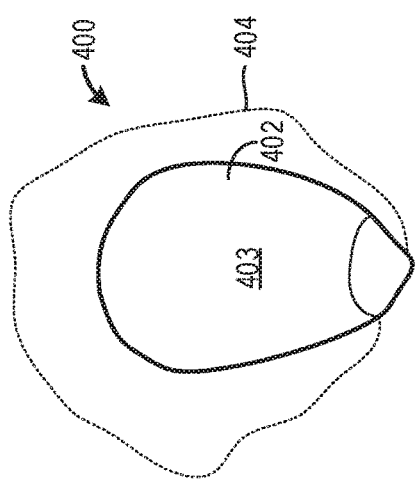
FIG. 4 shows an example of a popcorn kernel.

FIG. 4 shows an illustration of an unpopped popcorn kernel 400. The kernel 400 is an example of one of the constituents of the bulk material, shown in FIGS. 1-3. However, as previously discussed, a variety of types of bulk materials for use in the system have been contemplated. The kernel 400 includes a hull 402 (e.g., pericarp) enclosing a starchy internal material (e.g., germ and endosperm) forming a body 403. As described herein, an uncooked kernel is a popcorn kernel with a substantially continuous hull surrounding the starchy internal material. Likewise, a cooked kernel may be a popcorn kernel having the hull 402 ruptured and an expanded starchy internal material, in one example. A profile of an example of a cooked kernel whose internal material has expanded is indicated at 404. Thus, the expansion of the kernel's body is indicated at 404. When uncooked, the kernel includes liquid water and during the cooking process the liquid changes to steam that in turn increases the pressure in the kernel causing hull rupture and expansion of the starchy material. As such, popped kernels may have less moisture than unpopped kernels. It will be appreciated, that popping yields may be affected by the rate at which the kernels are heated (e.g., the duration of the phase change of water in the interior of the kernel). For instance, heating the kernel too slowly may result in steam slowly escaping from the tip of the kernel and remaining unpopped. On the other hand, heating the kernel too quickly can result in hull rupture prior to gelatinization of the inner starchy material. As such, the system may be controlled to achieve a kernel heating profile within a selected range that increases the amount of popped popcorn. The range may be selected based on moisture content in the kernels, the size of the kernels, the strain of corn, ambient temperature, humidity, etc.

Figure 5:
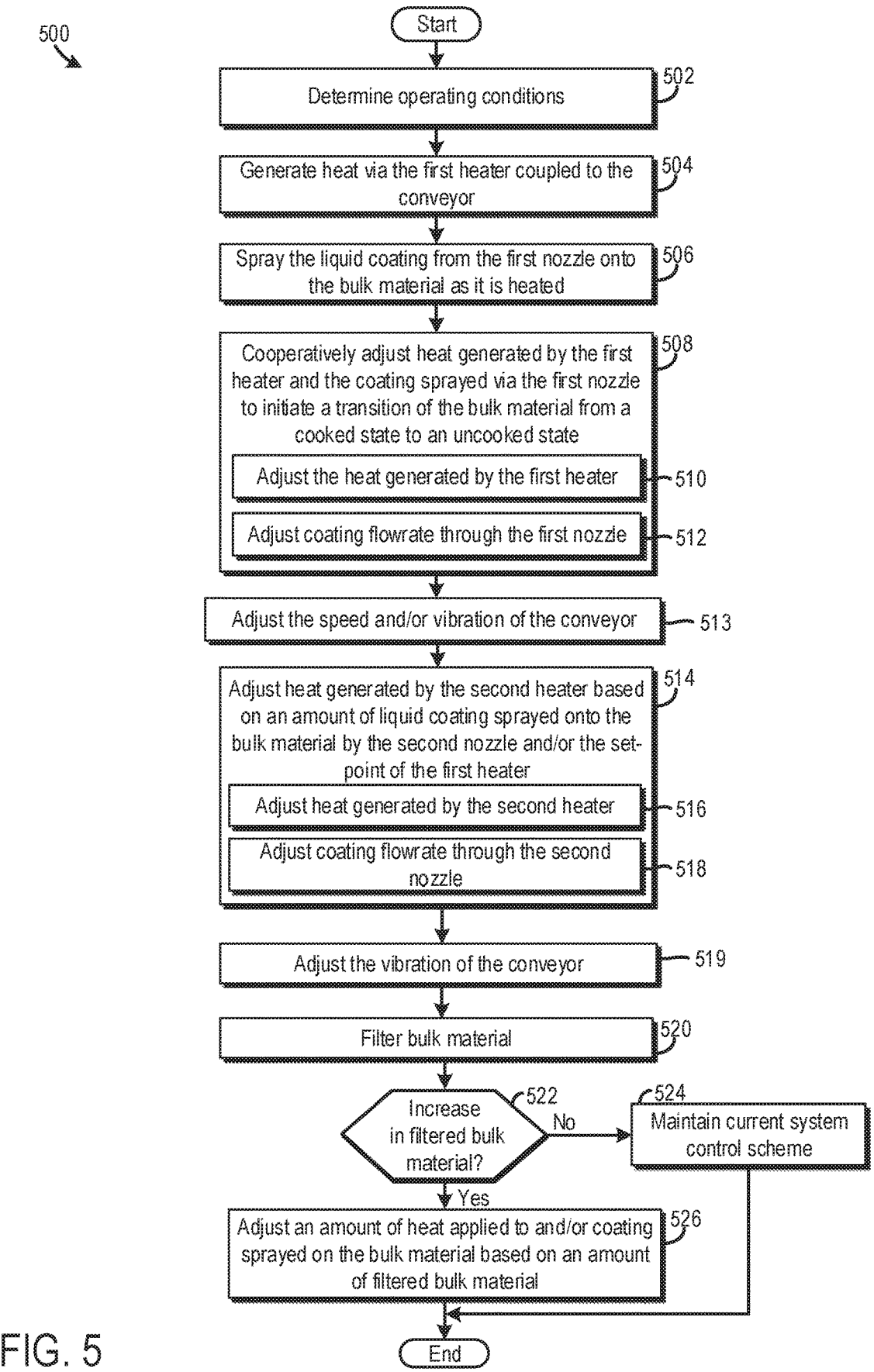
FIG. 5 shows a method for operation of a bulk material processing system.

FIG. 5 shows a method 500 for operation of a bulk material processing system. The method 500 as well as the other methods described herein may be implemented by the bulk material processing system and corresponding assemblies, components, etc., described herein with regard to FIGS. 1-4. However, in other examples, the method 500 and/or the other methods described herein may be implemented by other suitable bulk material processing systems. As previously discussed, the methods described herein may be implemented as computer readable instructions stored in memory executable by a processor in a controller.

At 502, the method includes determining operating conditions. The operating conditions may include temperature in the first heating zone, temperature in the second heating zone, coating flowrate in the first spray nozzle, coating flowrate in the second spray nozzle, ambient temperature, bulk material flowrate, quantity of filtered uncooked bulk material, humidity, atmospheric pressure, etc.

At 504, the method includes generating heat via a first heater coupled to the conveyor to heat the first heating zone. For instance, in some use-case examples, electric energy may be delivered to the heater or a gas burner may be ignited to initiate heat generation in the heater. At 506, the method includes spraying a liquid coating onto the bulk material as it is heated in the first heating zone via the first spray nozzle. The spray nozzle, valve, and/or the pump may be actuated to initiate the spray of the liquid coating, for instance.

At 508, the method includes cooperatively adjusting heat generated by the first heater and the coating sprayed via the first spray nozzle to initiate a transition of the bulk material from a cooked state to an uncooked state. Thus, the heater output may be increased along with the liquid spray from the nozzle or both the heater output and liquid flowrate through the nozzle may be decreased, in one use-case. Still further in other use-case example, the heater output may be increased as the spray flowrate is decreased or vice-versa.

Step 508 may include steps 510 and 512. At 510, the method includes adjusting (e.g., increasing and/or decreasing) heat generated by the first heater. As such, the electrical energy provided to the heater or the gas combustion in the heater may be varied to adjust the heat generated by the first heater, in some instances. At 512, the method includes adjusting (e.g., increasing and/or decreasing) the flowrate of the coating traveling through the first spray nozzle. It will be appreciated that the nozzle, valve, and/or pump may be operated to vary the coating flowrate.

At 513, the method includes adjusting the speed and/or vibration of the conveyor. For instance, the speed of the conveyor may be increased or decreased to allow the bulk material to achieve a desired heating profile causing the bulk material to transition to a cooked state from an uncooked state. In another example, the amplitude of conveyor vibration may be adjusted to increase cooked bulk material yields. It will also be appreciated that in some instances the speed and/or vibration of the conveyor may be adjusted based on the amount of heat generated by the first heater and/or the amount of coating sprayed onto the bulk constituents by the first spray nozzle.

At 514, the method includes adjusting heat generated by the second heater based on an amount of liquid coating sprayed onto the bulk material by the second spray nozzle and/or the set-point of the first heater. Step 514 may include steps 516 and 518. At 516, the method includes adjusting (e.g., increasing and/or decreasing) heat generated by the second heater. At 518, the method includes adjusting the flowrate of the coating traveling through the second spray nozzle. Again, the heater output and spray nozzle flowrate may be varied using the aforementioned techniques.

Next at 519, the method includes adjusting the vibration of the conveyor. Again, the vibration of the conveyor may be adjusted to allow the bulk material to achieve a cooked state. The amount of bulk material heating and/or coating spray may be taken into account when adjusting the vibration of the conveyor. It will be appreciated that the change in conveyor (e.g., conveyor pan) vibration may adjust the speed at which the kernels travel along the conveyor surface. However, when the conveyor utilizes a belt, the speed of the pulleys attached to the belt may be adjusted.

At 520, the method includes filtering uncooked constituents from the bulk material stream via the bulk material filtering assembly. As such, the uncooked constituents may pass through the filter on the conveyor. Next at 522, the method includes determining if there is an increase in an amount uncooked constituents filtered via the bulk material filtering assembly. Such a determination may be carried out using sensor signals, for example.

If it is determined that there is not an increase in the uncooked filtered bulk material (NO at 522), the method advances to 524. At 524, the method includes maintaining the current system control scheme. For instance, the system may be controlled according to predetermined operating set-points.

On the other hand, if it is determined that there is an increase in the uncooked filtered bulk material (YES at 522), the method proceeds to 526. At 526, the method includes adjusting (e.g., increasing and/or decreasing) an amount of heat applied to and/or coating sprayed onto the bulk material based on an amount of filtered bulk material. For instance, the first heater, the second heater, the first spray nozzle, and/or the second spray nozzle may be adjusted to alter the heat applied to the bulk material or the coating sprayed onto the material to increase the amount of bulk material that is cooked. As an example, if the temperature in one or both of the heating zones falls below desired temperature or temperature range, the output of heater in the corresponding zone may be increased or vice versa. Additionally, the amount of liquid coating sprayed onto the constituents may be increased. However, a variety of control variants have been envisioned. In this way, the amount of cooked bulk material produced by the system may be increased, thereby increasing the system's efficiency. It will also be appreciated that in one example the speed and/or vibration of the conveyor may be adjusted based on the increase in the filtered bulk material.

Figure 6:
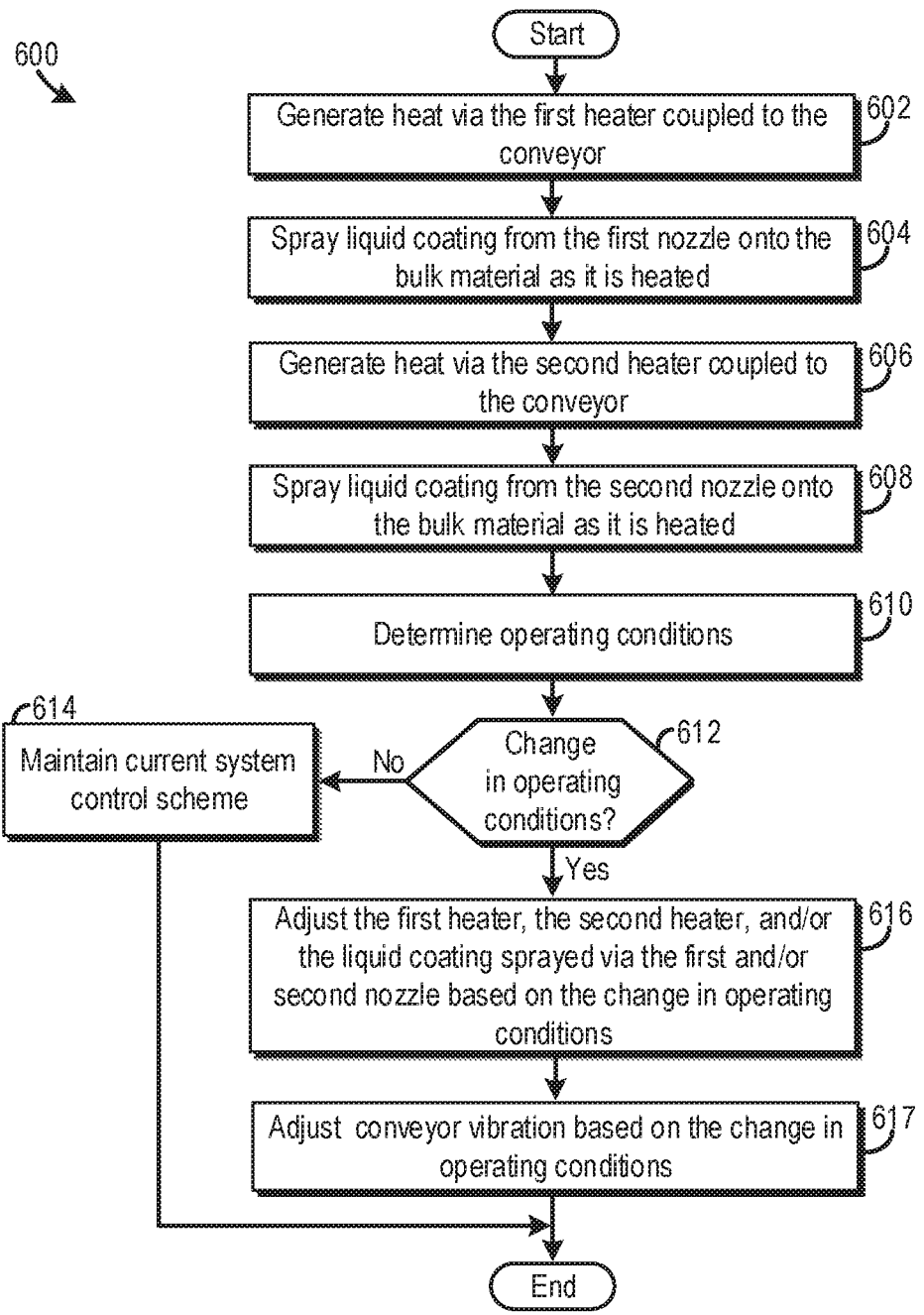
FIG. 6 shows another method for operation of a bulk material processing system.

FIG. 6 shows a method 600 for operation of a bulk material processing system. At 602, the method includes generating heat via the first heater coupled to the conveyor. For instance, electrical energy may be transferred to the heater to generate heat or gas combustion may be initiated in the heater.

At 604, the method includes spraying liquid coating from the first spray nozzle onto the bulk material as it is heated. For instance, the first nozzle may be opened, the valve may be opened, and/or the pump in the coating assembly may be operated to drive coating flow to the nozzle. At 606, the method includes generating heat via the second heater coupled to the conveyor. Again, the heat generation may be carried out via electrical energy transfer, gas combustion operation, etc. At 608, the method includes spraying liquid coating from the second spray nozzle onto the bulk material as it is heated. The nozzle spray may be carried out via nozzle, valve, and/or pump adjustment.

At 610, the method includes determining system operating conditions. As previously discussed the operating conditions may include temperature in the first heating zone, temperature in the second heating zone, coating flowrate in the first spray nozzle, coating flowrate in the second spray nozzle, ambient temperature, bulk material flowrate, quantity of filtered uncooked bulk material, etc.

At 612, the method includes determining if there is a change in system operating conditions. For instance, it may be determined that the quantity of uncooked constituents has increased or decreased by a threshold (e.g., a non-zero value), the temperature in one or both of the heating zones is outside a desired range, the yield of cooked constituents has fallen below a target set-point, etc. In other examples, it may be determined that the temperature in the first and/or second heating zone is outside a desired range. If it is determined that there is not a change in system operating conditions (NO at 612) the method advances to 614. At 614, the method includes maintaining the current system control scheme. For instance, the system may be operated according to predetermined set-points.

On the other hand, if it is determined that there is a change in system operating conditions (YES at 612) the method proceeds to 616. At 616, the method includes adjusting the first heater, the second heater, and/or the liquid coating sprayed via the first and/or second spray nozzle based on the change in operating conditions. Thus, in one use-case example, if it is determined that the temperature in the first heating zone is less than a desired range, the first heater may be adjusted to increase its heat output. In another use-case example, if it is determined that the yield of cooked bulk material constituents has fallen below a target value or the amount of bulk material introduced onto the conveyor has increased, the output of the first and/or second heater may be increased. In yet another use-case example, control of the first and second heaters and first and second spray nozzles may be coordinated to increase the yield of cooked bulk material.

Next at 617, the method may include adjusting conveyor vibration based on the change in operating conditions. In this way, the conveyor may be adjusted to further increase the amount of bulk material that is cooked, if desired. In other examples, the conveyor speed may additionally or alternatively be adjusted based on the change in operating conditions. Method 600 allows the heat and the coating provided to the bulk material in the system to be finely tuned to increase cooked bulk material yields in the system and decrease an amount of uncooked or partially cooked bulk material produced by the system, if desired.

Figure 7:
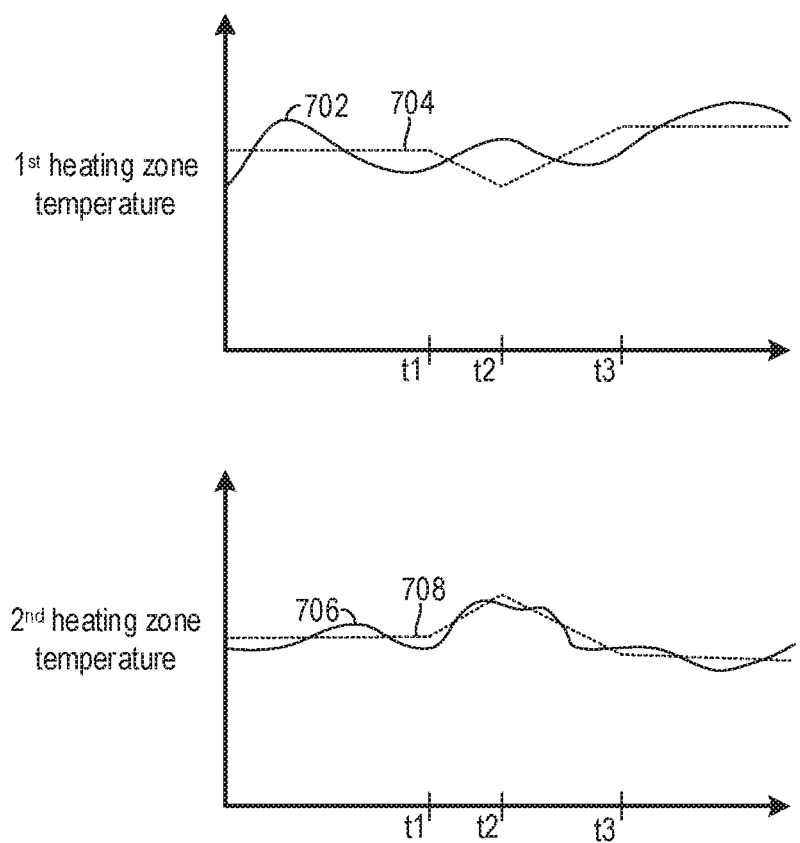
FIG. 7 shows a control diagram for a bulk material processing system.

Now turning to FIG. 7, depicting examples of temperature graphs during a bulk material processing system control routine. It will be appreciated that the control routine may be implemented via the bulk material processing system, described above with regard to FIGS. 1-6. The example of FIG. 7 is drawn substantially to scale, although each and every point is not labeled with numerical values. As such, relative differences in timings can be estimated by the drawing dimensions. However, other relative timings may be used, if desired. Furthermore, in each of the graphs time is represented on the abscissa and temperature is represented on the ordinate. Additionally, the graphical control strategy of FIG. 7 is illustrated as a use case example and that numerous system control strategies have been contemplated.

A temperature plot for the first heating zone is depicted at 702. A temperature set-point for the first heating zone is indicated at 704. As shown, the temperature set-point in the first heating zone may be dynamically adjusted. Additionally, a temperature plot for the second heating zone is depicted at 706. A temperature set-point for the second heating zone is indicated at 708.

At t1, the temperature set-point in the first heating zone is decreased and the set-point in the second heating zone is increased. As such, the output of the first heater is decreased at t1 to initiate the temperature decrease in the first heating zone. On the other hand, the output of the second heater is increased at t1 to initiate an increase in the temperature in the first heating zone.

At t2, the temperature set-point in the first heating zone is increased while the temperature set-point in the second heating zone is decreased. Therefore, the first heater's output is increased at t2 and the second heater's output is decreased at t2. In other examples, the temperature profile in the first and/or second heating zones may be substantially a flat line at around 380° F., for instance. It will also be appreciated that oil may be sprayed onto the kernels prior to and/or as they travel through the heating zones. In one example, the oil may help facilitate the popping by increasing the surface area through which heat can be transferred to the kernel. However, in another example, the oil may be introduced to add flavor and simulate home stovetop popcorn, for instance. In such an example, the oil may be sprayed onto the popcorn during the popping process as the steam is released from the kernel. In this way, the oil is absorbed into the popcorn as the kernel is expanding. Additionally, in such an example, unpopped kernels may be filtered out from the conveyor upstream of the second heating zone and downstream of the first heating zone. Specifically, the unpopped kernels may be filtered out of the assembly prior to oil is sprayed onto the constituents in the second heating zone. The filtered kernels may then be delivered to a location upstream of the first heating zone and may in some cases be delivered to a section on the conveyor created by a divider to partition the filtered constituents from other constituents.

The technical effect of the methods and control techniques for operating the bulk material processing system is increased system efficiency and bulk material constituent yields due to the more granular heating, spray nozzle, and conveyor control.

FIGS. 1-4 show example configurations with relative positioning of the various components. If shown directly coupled or, contacting each other, then such elements may be referred to as directly coupled or directly contacting, respectively, at least in one example. Similarly, elements shown adjacent or contiguous to one another may be adjacent or contiguous to one another, respectively, at least in one example. As an example, components in face-sharing contact with one another may be referred to as components in face-sharing contact. As another example, elements spaced apart from each other with only a space therebetween and no other components may be referred to as such, in at least one example. As yet another example, elements shown below/above one another, at opposite sides to one another, or to the right/left of each other may be referred to as such, relative to one another. Further, as shown in the figures, a topmost element, section, or point of element may be referred to as a "top" of the component and a bottommost element, section, or point of the element may be referred to as a "bottom" of the component, in at least one example. As used herein, upper/lower, top/bottom, above/below, may be relative to a vertical axis (e.g., gravitational axis) of the figures and used to describe positioning of elements of the figures relative to one another. As such, in one example, elements shown above other elements may be located vertically above the other elements. As yet another example, shapes of the elements, components, etc. depicted within the figures may be referred to as having those shapes (e.g., such as being circular, straight, planar, curved, rounded, chamfered, angled, or the like). Further, in at least one example, elements shown intersecting each other may be referred to as intersecting elements or intersecting each other. Further still, in one example, an element, component, etc. shown within another element or shown outside of another element may be referred as such.

The invention will further be described in the following paragraphs. In one aspect, a bulk material processing system is provided that comprises a conveyor assembly including: a conveyor with a conveyor surface supporting a plurality of constituents of a bulk material received from a bulk material source; and a motor configured to generate conveyor movement; and a heating assembly including a first heater configured to generate heat at a first heating zone on the conveyor surface; and a coating application assembly including a first coating source configured to provide a first liquid coating to a first spray nozzle configured to spray the first liquid coating onto a portion of the plurality of constituents of the bulk material in the first heating zone while the first heater is activated.

In another aspect, a method for operating a bulk material processing system is provided that comprises operating a heating assembly including a first heater coupled to a conveyor to apply heat to a plurality of constituents of a bulk material in a first heating zone of a conveyor; and while the plurality of constituents are being heated, operating a coating application assembly to spray a first liquid coating onto the plurality of heated constituents to change the plurality of heated constituents from an uncooked state to a cooked state. In one example, the method may further comprise varying an amount of the heat generated by the first heater and an amount of the first liquid coating sprayed onto the plurality of constituents by the first spray nozzle based on an amount of the bulk material passing through the first heating zone. In another example, the method may further include varying an amount of heat generated by a second heater based on an amount of a second liquid coating sprayed onto the plurality of constituents by a second spray nozzle; wherein the second heater is configured to generate heat at a second heating zone on the conveyor surface and the second spray nozzle receives a second liquid coating from a second coating source and is configured to spray the second liquid coating onto the plurality of constituents while the second heater is activated. In yet another example, the method may further comprise filtering uncooked constituents from the plurality of constituents via a bulk material filtering assembly after the plurality of constituents are heated and the first liquid coating is sprayed onto the plurality of constituents; and varying an amount of the heat applied to the plurality of constituents from the first heater based on an amount of the uncooked constituents filtered by the bulk material filtering assembly. Further, in another example, the method may further include varying an amount of the first liquid coating sprayed onto the plurality of constituents by the first heater based on an amount of uncooked constituents filtered by the filter in the bulk material filtering assembly. In another example the method may further include vibrating the conveyor according to a predetermined amplitude and pattern; and varying an amplitude and/or pattern of vibration generated by a motor coupled to the conveyor based on an amount of uncooked constituents filtered by the filter in the bulk material filtering assembly.

In yet another aspect, a popcorn processing system is provided that comprises a conveyor assembly including: a conveyor with a conveyor surface supporting a plurality of popcorn kernels received from a popcorn source; and a motor designed to generate conveyor movement; and a heating assembly including a first heater configured to generate heat at a first heating zone on the conveyor surface; and an oil application assembly including a first oil source storing liquid oil and a first spray nozzle configured to spray the liquid oil onto the plurality of popcorn kernels while they are heated by the first heater; and a controller including computer readable instructions stored in non-transitory memory that when executed cause a processor to: cooperatively adjust an amount of heat applied to the plurality of popcorn kernels and an amount of the liquid oil sprayed onto the plurality of popcorn kernels to cook the plurality of popcorn kernels such that a pericarp is ruptured and a kernel body is expanded in at least a portion of the plurality of popcorn kernels.

In any of the aspects or combinations of the aspects, the bulk material processing system may further comprise a controller including computer readable instructions stored in non-transitory memory that when executed cause a processor to: vary an amount of the heat generated by the first heater based on an amount of the first liquid coating sprayed onto the portion of the plurality of constituents by the first spray nozzle to change the plurality of constituents from an uncooked state to a cooked state.

In any of the aspects or combinations of the aspects, the amount of the heat may be varied based on an amount of the bulk material passing through the first heating zone.

In any of the aspects or combinations of the aspects, the bulk material processing system may further comprise a second heater coupled to the conveyor and configured to generate heat at a second heating zone on the conveyor surface; and a second spray nozzle configured to receive a second liquid coating from a second coating source and configured to spray the second liquid coating onto the plurality of constituents while the second heater is activated; wherein the controller may include computer readable instructions stored in the non-transitory memory that when executed cause the processor to: vary an amount of the heat generated by the second heater based on an amount of the second liquid coating sprayed onto the plurality of constituents by the second spray nozzle.

In any of the aspects or combinations of the aspects, the controller may include computer readable instructions stored in the non-transitory memory that when executed cause the processor to executable by the processor to: vary the amount of the heat generated by the second heater based on the amount of the heat generated by the first heater and/or vary the amount of the second liquid coating sprayed onto the plurality of constituents by the second spray nozzle based on the amount of the first liquid coating sprayed onto the plurality of constituents by the first spray nozzle.

In any of the aspects or combinations of the aspects, the bulk material may include popcorn and the plurality of constituents includes a plurality of popcorn kernels and wherein the first liquid coating includes a liquid oil.

In any of the aspects or combinations of the aspects, the bulk material processing system may further comprise a bulk material filtering assembly including: a filter positioned in the conveyor surface downstream of the first heater and the first spray nozzle, wherein the filter is configured to filter a portion of the plurality of constituents of the bulk material; and a return conduit configured to transport the filtered portion of the plurality of constituents back to the conveyor upstream of the first heating zone.

In any of the aspects or combinations of the aspects, the bulk material processing system may further comprise a controller including computer readable instructions stored in non-transitory memory that when executed cause a processor to: vary an amount of the heat applied to the plurality of constituents by the first heater and/or vary an amount of the first liquid coating sprayed onto the plurality of constituents by the first spray nozzle based on the portion of the plurality of constituents filtered by the filter in the bulk material filtering assembly.

In any of the aspects or combinations of the aspects, the bulk material processing system may further comprise a controller including computer readable instructions stored in the non-transitory memory that when executed cause a processor to: vary an amplitude and/or pattern of vibration generated by the motor based on an amount of the first liquid coating sprayed onto the plurality of constituents.

In any of the aspects or combinations of the aspects, the motor may be designed to vibrate the conveyor.

In any of the aspects or combinations of the aspects, the popcorn processing system may further comprise a second heater configured to generate heat at a second heating zone on the conveyor surface; and a second spray nozzle receiving liquid oil from a second oil source and configured to spray the liquid oil onto a portion of the plurality of popcorn kernels in the second heating zone while the second heater is activated; wherein the controller may include computer readable instructions stored in non-transitory memory that when executed cause the processor to: vary the amount of the heat generated by the second heater based on the amount of the heat generated by the first heater and/or an amount of the liquid oil sprayed from the first spray nozzle and/or the second spray nozzle.

In any of the aspects or combinations of the aspects, popcorn processing system may further comprise a popcorn filtering assembly including: a filter positioned below the conveyor surface and downstream of the first heater and the first spray nozzle, where the filter is configured to filter a plurality of unpopped popcorn kernels from a plurality of popped popcorn kernels, where the plurality of unpopped and popped popcorn kernels are included in the plurality of popcorn kernels; and a return conduit transporting the filtered portion of the plurality of popcorn kernels back to the conveyor upstream of the first heating zone.

In any of the aspects or combinations of the aspects, the controller may further include computer readable instructions stored in non-transitory memory that when executed cause the processor to: vary an amount of the heat applied to the plurality of kernels by the first heater and/or an amount of oil sprayed onto the plurality of kernels based on an amount of unpopped kernels filtered by the filter in the popcorn filtering assembly.

The processor described herein may include one or more hardware or firmware devices configured to execute hardware or firmware instructions. The processor may include one or more single-core or multi-core devices, and the instructions executed thereon may be configured for sequential, distributed, and/or parallel processing. Individual components of the processor may optionally be included in two or more separate devices (e.g., remotely located coordinated devices). Aspects of the processor may be executed by remotely accessible computing devices on one or more networks, for instance. The memory described herein also includes one or more physical devices.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A bulk material processing system, comprising:
   a conveyor assembly including:
      a conveyor with a conveyor surface supporting a plurality of constituents of a bulk material received from a bulk material source; and
      a motor configured to generate conveyor movement;
   a heating assembly including a first heater configured to generate heat at a first heating zone on the conveyor surface;
   a coating application assembly including a first coating source configured to provide a first liquid coating to a first spray nozzle configured to spray the first liquid coating onto a portion of the plurality of constituents of the bulk material in the first heating zone while the first heater is activated; and
   a controller including computer readable instructions stored in non-transitory memory that when executed cause a processor to:
      vary an amount of the heat generated by the first heater based on an amount of the first liquid coating sprayed onto the portion of the plurality of constituents by the first spray nozzle to change the plurality of constituents from an uncooked state to a cooked state;
   wherein the amount of the first liquid coating is determined based on one or more sensors which include a first flowrate sensor that is coupled to the first spray nozzle.

2. The bulk material processing system of claim 1, wherein the one or more sensors include a pump flow meter that is coupled to a pump which is connected to the first coating source.

3. The bulk material processing system of claim 1, wherein the amount of the heat is varied based on an amount of the bulk material passing through the first heating zone and wherein the amount of heat is determined based on the one or more sensors which include a bulk material flow sensor that is coupled to the bulk material source.

4. The bulk material processing system of claim 1, further comprising:
   a second heater coupled to the conveyor and configured to generate heat at a second heating zone on the conveyor surface; and
   a second spray nozzle configured to receive a second liquid coating from a second coating source and configured to spray the second liquid coating onto the plurality of constituents while the second heater is activated;
   wherein the controller includes computer readable instructions stored in the non-transitory memory that when executed cause the processor to:
      vary an amount of the heat generated by the second heater based on an amount of the second liquid coating sprayed onto the plurality of constituents by the second spray nozzle;
   wherein the amount of the second liquid coating is determined based on the one or more sensors which include a second flowrate sensor that is coupled to the second spray nozzle.

5. The bulk material processing system of claim 4, wherein the controller includes computer readable instructions stored in the non-transitory memory that when executed cause the processor to executable by the processor to:
   vary the amount of the heat generated by the second heater based on the amount of the heat generated by the first heater and/or vary the amount of the second liquid coating sprayed onto the plurality of constituents by the second spray nozzle based on the amount of the first liquid coating sprayed onto the plurality of constituents by the first spray nozzle.

6. The bulk material processing system of claim 1, wherein the bulk material includes popcorn and the plurality of constituents includes a plurality of popcorn kernels and wherein the first liquid coating includes a liquid oil.

7. A bulk material processing system, comprising:
   a conveyor assembly including:
      a conveyor with a conveyor surface supporting a plurality of constituents of a bulk material received from a bulk material source; and
      a motor configured to generate conveyor movement;
   a heating assembly including a first heater configured to generate heat at a first heating zone on the conveyor surface;
   a coating application assembly including a first coating source configured to provide a first liquid coating to a first spray nozzle configured to spray the first liquid coating onto a portion of the plurality of constituents of the bulk material in the first heating zone while the first heater is activated; and
   a bulk material filtering assembly including:
      a filter positioned in the conveyor surface downstream of the first heater and the first spray nozzle, wherein the filter is configured to filter a portion of the plurality of constituents of the bulk material; and
      a return conduit configured to transport the filtered portion of the plurality of constituents back to the conveyor upstream of the first heating zone.

8. The bulk material processing system of claim 7, further comprising a controller including computer readable instructions stored in non-transitory memory that when executed cause a processor to:
   vary an amount of the heat applied to the plurality of constituents by the first heater and/or vary an amount of the first liquid coating sprayed onto the plurality of constituents by the first spray nozzle based on the portion of the plurality of constituents filtered by the filter in the bulk material filtering assembly;
   wherein the amount of the first liquid coating is determined based on one or more sensors which include a first flowrate sensor that is coupled to the first spray nozzle.

9. The bulk material processing system of claim 8, wherein the motor is designed to vibrate the conveyor.

10. The bulk material processing system of claim 9, further comprising a controller including computer readable instructions stored in the non-transitory memory that when executed cause a processor to:
 vary an amplitude and/or pattern of vibration generated by the motor based on an amount of the first liquid coating sprayed onto the plurality of constituents.

* * * * *